Aug. 29, 1967   H. C. JACOBSON   3,338,114
GEAR TRANSFER MECHANISM
Filed Oct. 4, 1965   4 Sheets-Sheet 1
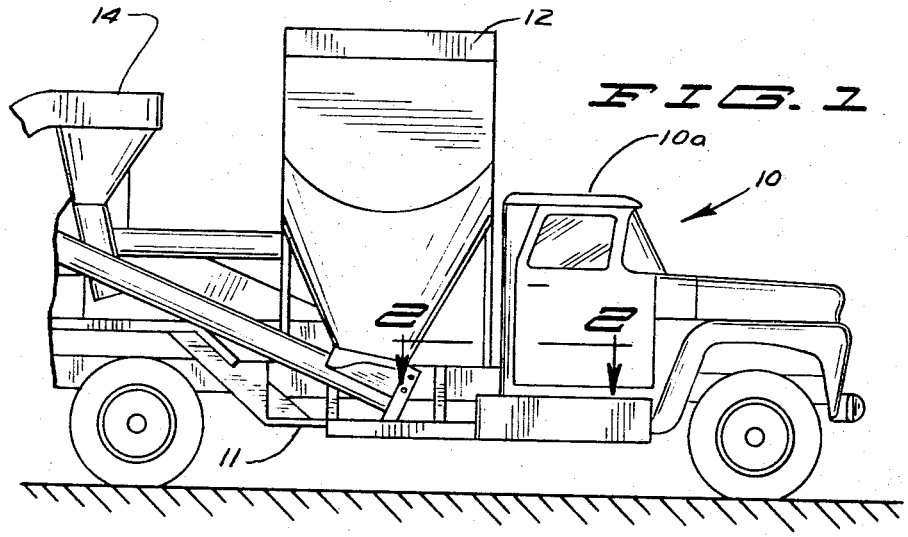
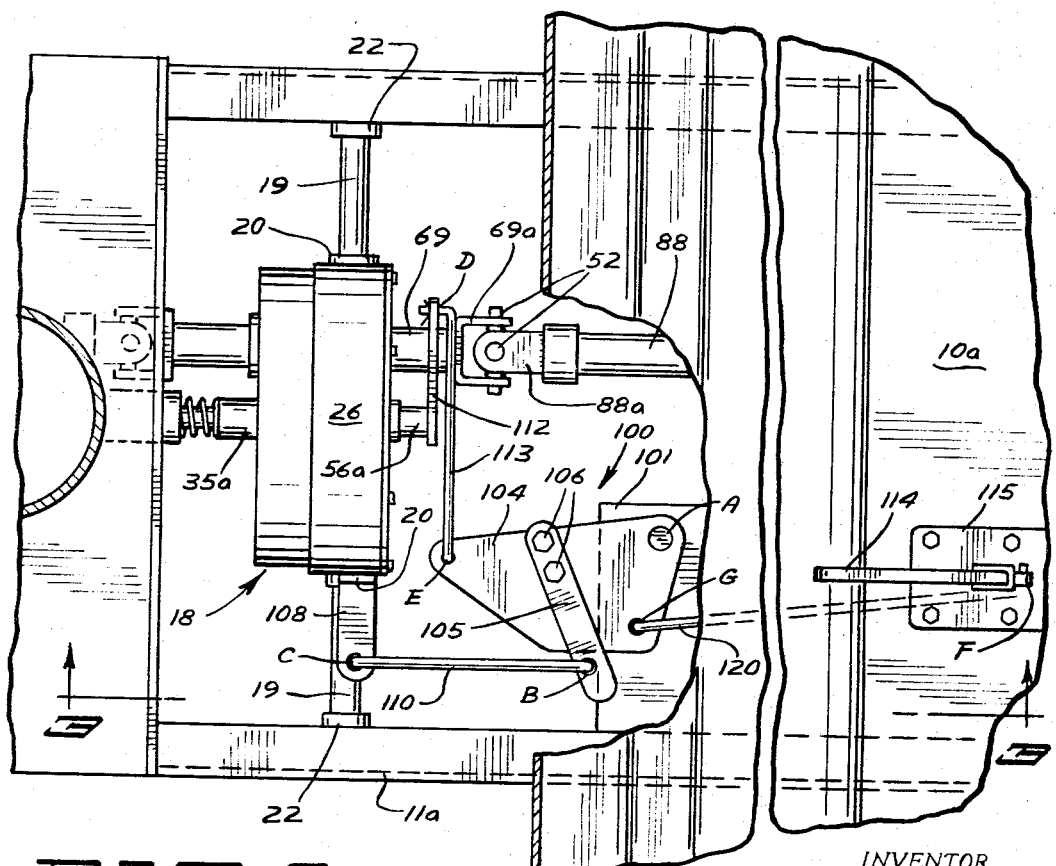
INVENTOR.
HOWARD C. JACOBSON
BY
Richard Gregory
ATTORNEYS Aug. 29, 1967   H. C. JACOBSON   3,338,114
GEAR TRANSFER MECHANISM
Filed Oct. 4, 1965   4 Sheets-Sheet 2
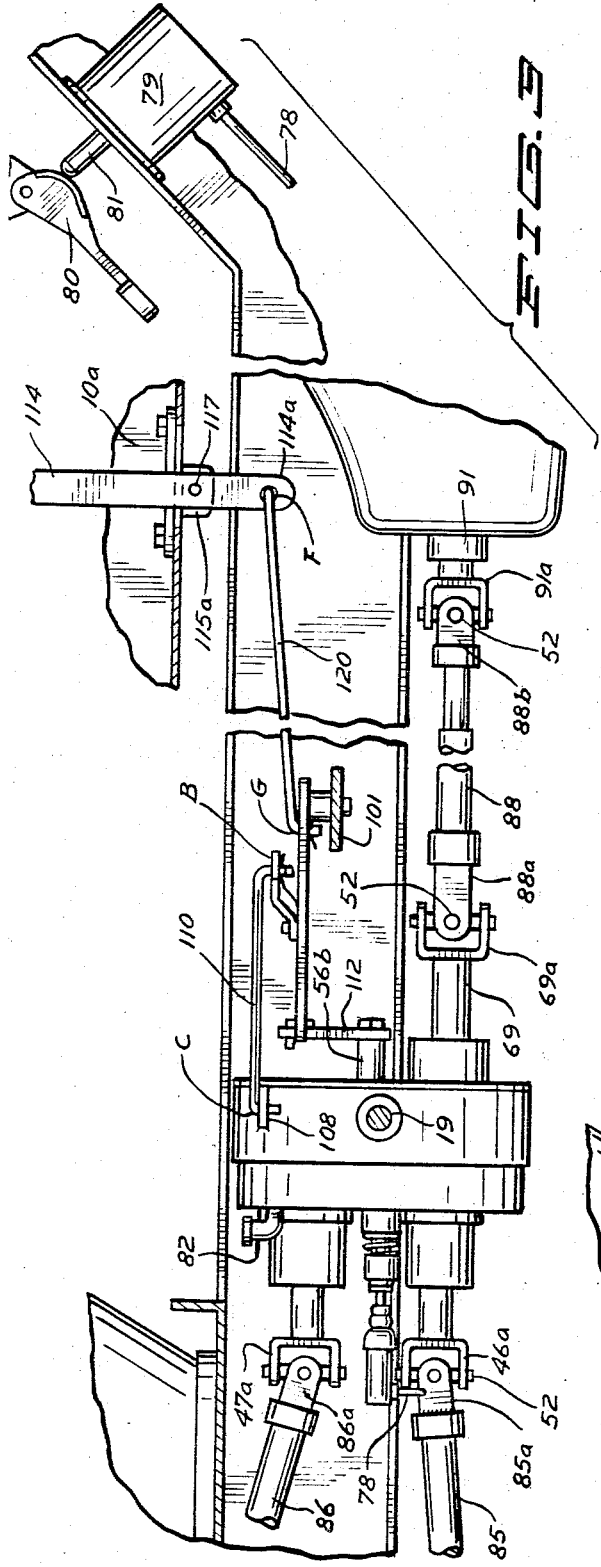
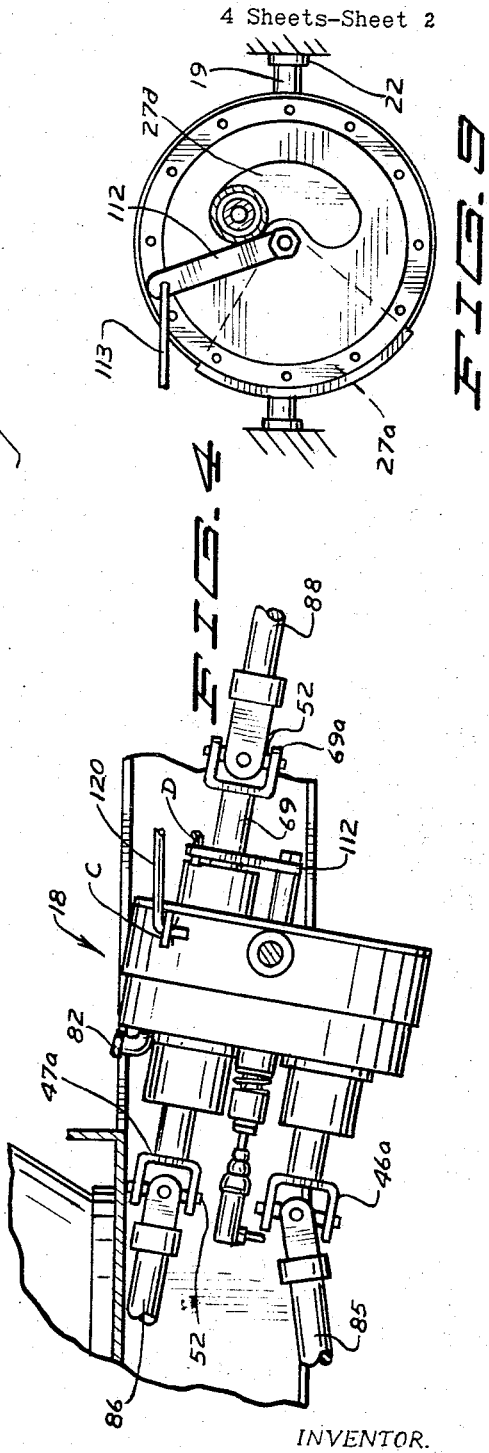
INVENTOR.
HOWARD C. JACOBSON
BY
Richard Gregory
ATTORNEYS

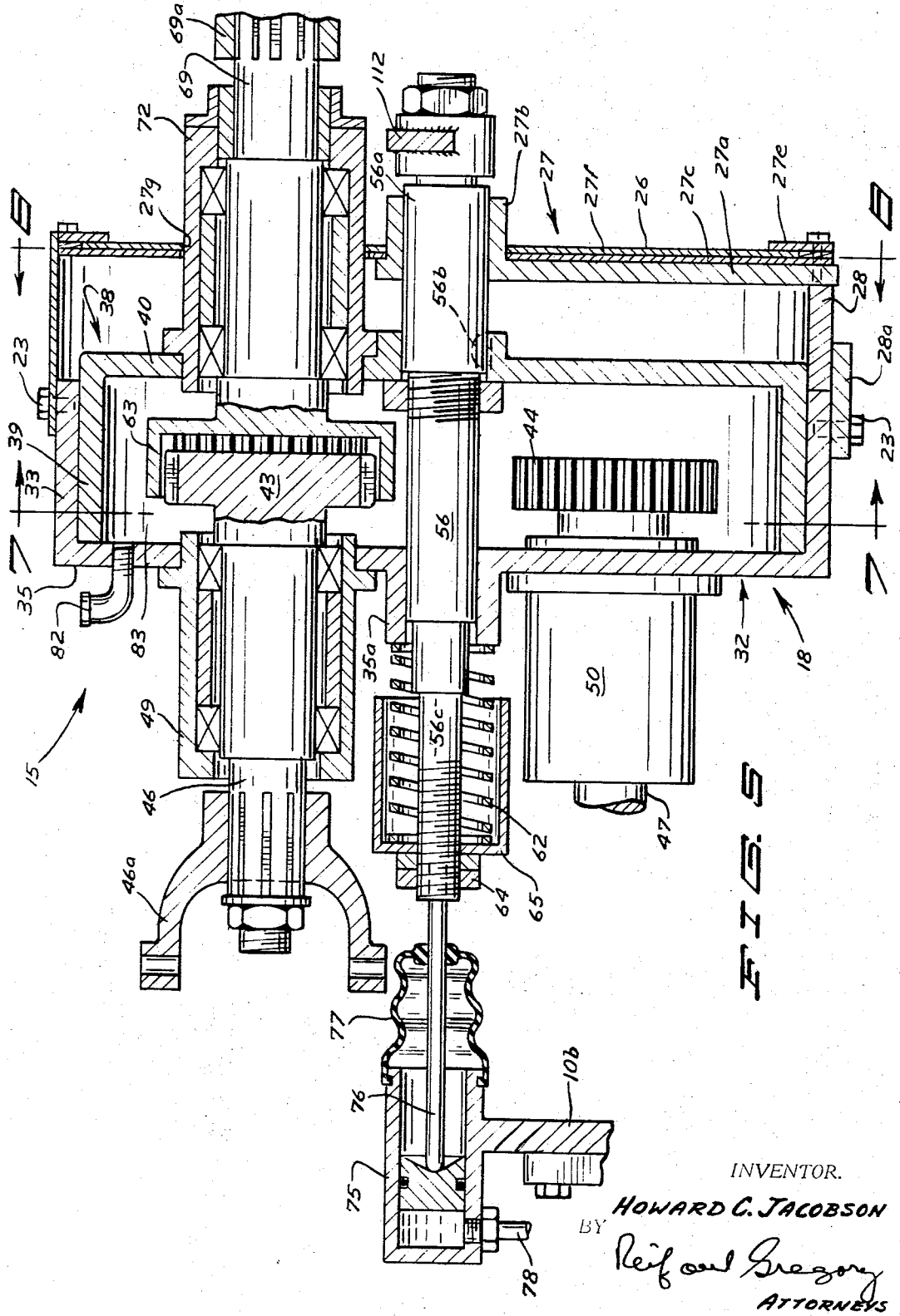

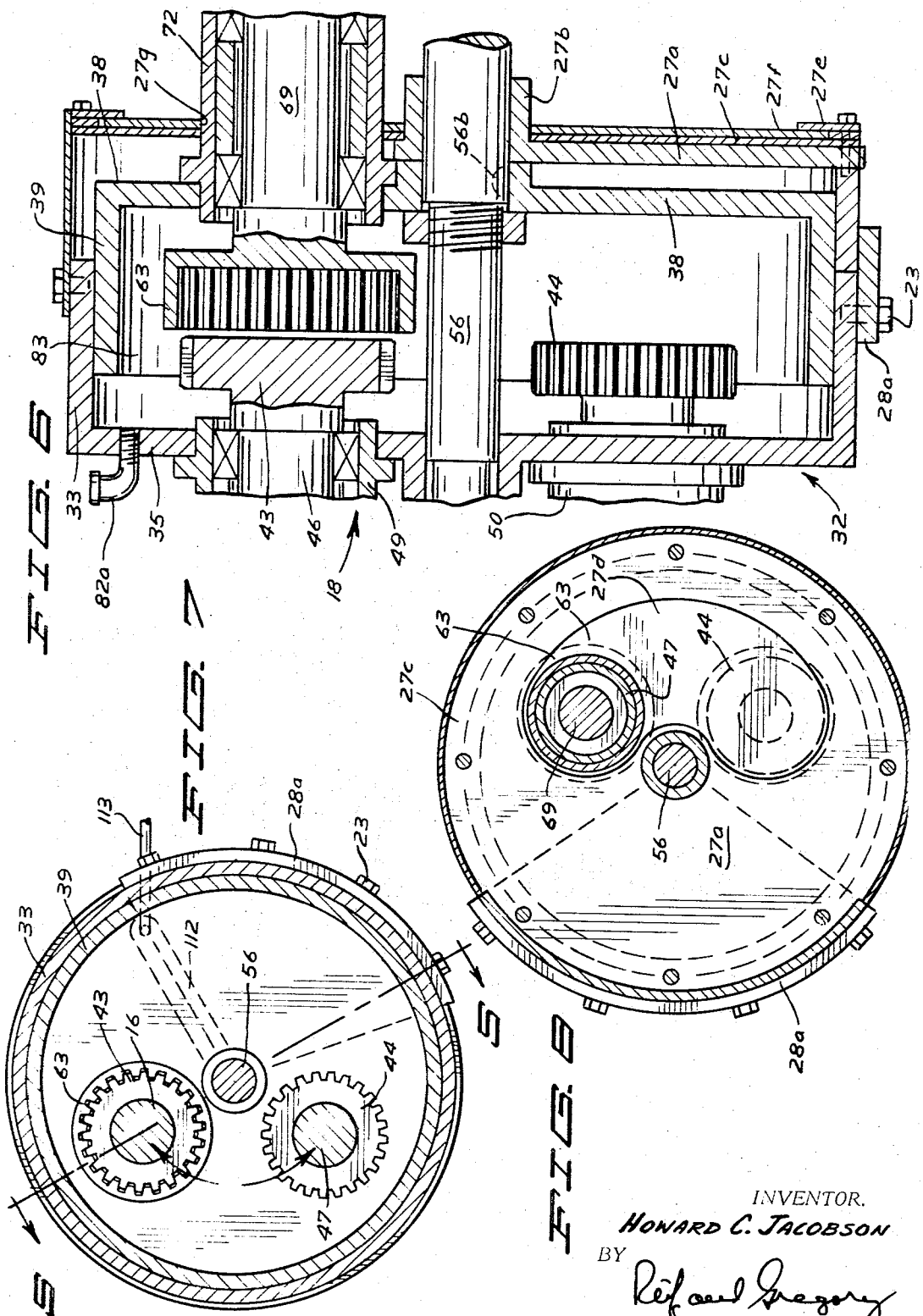

United States Patent Office 3,338,114
Patented Aug. 29, 1967

3,338,114
GEAR TRANSFER MECHANISM
Howard C. Jacobson, St. Paul, Minn. (Tower Apts., 19 S. 1st St., Apt. B706, Minneapolis, Minn. 55401)
Filed Oct. 4, 1965, Ser. No. 492,493
5 Claims. (Cl. 74—665)

The invention herein relates to improvements in a power transfer mechanism particularly adapted to transfer a driving element from one to another of driven elements. More particularly, the invention herein has to do with a mobile feed milling apparatus whereby the mobile vehicle, such as a truck, carrying the apparatus is arranged and constructed to have its drive shaft which normally drives its differential shaft transferred to drive a work shaft arranged to operate the milling apparatus.

It is an object of this invention to provide a simple and positive means for transferring a driving mechanism from one to another of driven elements.

It is another object of this invention to provide a transfer mechanism for a driving element particularly constructed to axially align the driving element with one or the other of otherwise non-aligned driven elements.

It is a more specific object of this invention to provide a vehicle carrying milling apparatus whereby the drive shaft of said vehicle may be transferred to drive a work shaft particularly adapted to operate the milling apparatus.

These and other objects and advantages of the invention will be set forth in the following description made in connection with the accompanying drawings in which like reference characters refer to similar parts throughout the several views and in which:

FIG. 1 is a broken view in elevation on a reduced scale showing a vehicle in connection with the invention herein;

FIG. 2 is a broken view in horizontal section taken on line 2—2 of FIG. 1 as indicated;

FIG. 3 is a broken composite view in vertical section taken on line 3—3 of FIG. 2 as indicated;

FIG. 4 is a view similar to that of FIG. 3 showing a portion thereof in an alternate position;

FIG. 5 is a view in section on an enlarged scale taken on line 5—5 of FIG. 7 as indicated;

FIG. 6 is a view similar to that of FIG. 5 showing a portion thereof in a different operating position;

FIG. 7 is a view in vertical section taken on line 7—7 of FIG. 5;

FIG. 8 is a view in vertical section taken on line 8—8 of FIG. 5 as indicated; and FIG. 9 is a broken view in section showing a detail of the apparatus in front elevation.

Referring to FIG. 1 of the drawings, a motor vehicle of suitable character is designated generally by the character 10, and indicated as being mounted on the chassis 11 of said vehicle are a mill and mixer unit 12 and a grinding unit 14.

The invention herein particularly relates to a transfer mechanism 15 shown generally in FIGS. 2 and 5. Said transfer mechanism comprises a housing or gear casing 18 substantially cylindrical in form having supporting stub shafts 19 extending radially of either side thereof and being journalled in frame or chassis mounted plate brackets 22 for pivoted or swinging support of said housing.

Said housing as here shown comprises a forward casing or cap member 26 having a front wall 27 and a cylindrical side wall 28. Said stub shafts 19 are secured to opposed side bracket portions 20 of said casing member 26.

Said side wall is formed of heavier stock at its lower than its upper portion, as shown in FIG. 5. Forming an upstanding inner portion of said front wall is a plate 27a in the form of a sector of substantial stock having integral therewith a bushing 27b comprising a forwardly extending hub portion. Overlying said plate 27a is a circular plate 27c having therein an arcuate slot 27d which has an extent of substantially 120 degrees. Overlying said plate member 27c and retained by a circular flange 27e is a rotatable plate member 27f having a non-axial circular opening 27g therein.

Said casing member 26 partially overlies an upper open side portion of a stationary drum 32 having a cylindrical side wall 33 and a rear wall 35. Said casing member 26 abuts the adjacent lower portion of said side wall 33. The upper overlapping portions of said side walls 28 and 33 are secured by bolts 23 and the lower portions of said side wall 28 carries a curved plate 28a which overlies the adjacent portion of the wall 33 and the same are shown secured by bolts 23.

A second cup-shaped drum 38 is carried within said casing member 26 and is adapted to have a telescopic arrangement with said first drum 32 facing thereinto and being further adapted, as will be described, to have rotatable and axial movement relative to said drum 32. Said second drum comprises a side wall 39 and a front wall 40.

Carried within said stationary drum 32 in spaced relation to one another, as will further be described, are driven gears 43 and 44 shown as being in the form of spur gears. Said gears respectively have relatively short shafts 46 and 47 integral therewith extending rearwardly of said drum 32 and being journaled in bearing housings 49 and 50 which will be secured to the outer side of said drum 32 in a conventional manner. Carried at the free ends of shafts 46 and 47 are yokes 46a and 47a. Said yokes will be splined onto said shafts in a conventional manner to provide axial movement.

A shaft 56 having a rearward stepped reduction in diameter is carried by said drum 38 extending axially thereof forwardly through said casing member 26 and bushing 27b and rearwardly through said drum member 32 which is provided with an axial bushing 35a extending outwardly in the form of a hub. Said bushings 27b and 35a support said shaft 56. Said shaft in a conventional manner, as by the key 56b, will be secured to said drum 38 to be integral therewith.

Carried in a sleeve housing 65 on the rearwardly extending portion 56c of said shaft 56 is a coiled spring 62 bearing at one end against the adjacent shoulder of the hub 35a and at its other end against an end wall of said sleeve housing with said housing being retained by a nut 64 threaded onto the adjacent free end of said shaft.

Carried within said drum 38 is a crown gear 63 adapted to mate with said gears 43 and 44. Said gear 63 has integral therewith a forwardly extending shaft 69 carrying at its free end a yoke 69a and is journalled in a bearing housing 72 carried by the front wall 40 of said drum 38 and the front wall 27f of said casing member 26.

Secured to a frame portion 10b of said vehicle 10 is a conventional hydraulic slave cylinder 75 having a piston and rod 76 therein adapted to engage the free end of said shaft 56 to move said shaft axially. Said cylinder 75 carries a flexible dust cap 77 and a hydraulic line 78 will run to a conventional master cylinder 79 operated by a cammed pedal 80 depressing an actuating pin 81. Said pedal will be mounted within the cab of said vehicle for operation by the driver of the vehicle. Reference is had to FIGS. 5 and 3.

An air vent 82 is provided for communication with the atmosphere of the chamber 83 formed by the drums 32 and 38.

The yoke 46a connects with the yoke 85a of the differential shaft 85 of the vehicle by means of a universal joint 52. The yoke 47a connects with the yoke 86a of the driven work shaft 86 by means of a universal joint 52.

Said work shaft will run to a gear case from which driving means will operate the mixing mill and grinding mill carried by the vehicle. The gear case and related driving means are not shown and do not form a part of the invention disclosed herein.

It will be noted that the differential shaft inclines downwardly somewhat and that the work shaft inclines upwardly. The shafts are substantially parallel and thus they are characterized as having a parallel angular relationship.

The yoke 69a by means of a universal joint 52 is connected with a yoke 88a of a connecting shaft 88 which in a similar manner is connected with a slip yoke 88b which in turn is connected by means of a universal joint 52 to the yoke 91a of the drive shaft 91 of the vehicle. The slip yoke is not illustrated in detail. This represents a conventional connection to provide limited axial movement.

With particular reference to FIGS. 2-4, the character 100 indicates generally the mechanical linkage used in the operation of the transfer mechanism. Extending inwardly from the frame member 11a is a substantially horizontal plate bracket 101. Pivoted to the upper side of said plate bracket, as by suitable means as by a rivet, is a plate member 104 polygonal in form pivoted at point A therein, with said point representing the fulcrum point of said plate member and said plate member may be regarded as representing a crank.

Angled across said plate member 104 away from said fulcrum point is a bar 105 secured by bolts 106 and having an apertured free end extended portion indicated as point B.

Extending from said casing member 26 in the direction of frame member 11a is an angled bracket 108 having an apertured free end portion indicated as point C. A link member 110 in the form of a rod connects said bar 105 and said bracket 108 having angled end portions respectively disposed through said apertures at points B and C.

Secured to the free forward extended portion 56a of said shaft 56 and normal to the axis thereof is a straight bar 112 forming a crank and having an apertured free end portion indicated as point D.

Said plate member 104 is apertured at point E as shown, whereby said points A, B, E define a triangle. A rod-like link 113 connects the points D and E having angled end portions disposed through said apertures at said points.

Mounted in the cab portion 10a of said vehicle 10 in a conventional manner is a stick shifting lever 114 upstanding from a floor bracket 115 being pivoted to a depending flange portion 115a thereof by a rivet 117 and having an apertured portion 114a extending below said cab, as indicated in FIG. 3. Said aperture is indicated as point F.

Said plate member 104 has another aperture at point G, as shown in FIG. 2, and a link 120 in the form of a rod connects the points F and G having angled end portions disposed through said apertures at said points.

OPERATION

Disclosed herein is a simple, efficient and direct transfer means for utilizing the drive shaft of a motor vehicle for work other than driving the differential shaft of the vehicle.

The differential shaft is inclined somewhat downwardly and rearwardly and the work shaft 86 which operates the milling apparatus is inclined upwardly such as on the order of approximately seven degrees from the horizontal. For a more efficient and a more quiet operation it is desirable that the driving and driven gears be axially aligned with the driven shafts.

The essential element of novelty herein has to do with the transfer of the drive shaft connection between the differential and work shafts and for the axial alignment of the gears involved with the driven shafts.

The crown gear 63 forms the driving gear. The driven gears 43 and 44 are here indicated as being spaced approximately 120 degrees apart within the drum 32. The crown and driven gears are respectively connected to the driving and driven shafts by splined universal connections as described, which provides the limited axial movement which is required for the tilting of the housing 18.

The crown gear 63 and the drum 38 within which it is carried are moved axially by the cammed pedal 80 and its attendant hydraulic system for disengagement from the gears 43 or 44. The spring 62 normally urges the driving gear 63 in operating or driving engagement with either the gear 43 or 44 as the case may be.

When the operator depresses the pedal 80, the gear 63 will be withdrawn from engagement with either the gear 43 or 44.

The operator next moves the crown gear from one driven gear to the other. It will be assumed for purpose of illustration that the crown gear has been disengaged from the gear 43, as indicated in FIG. 6. The operator pulls the lever 114 in the direction of himself, moving the link arm 120 forwardly and pivoting the plate member 104 to the right, as viewed in FIG. 2. The arm 105 is moved forwardly, pulling the link arm 110 forwardly and thus tilting the housing 18 forwardly. At the same time the link arm 113 is moved transversely of the housing in the direction of the frame member 11a rotating the shaft 56, the drum 38 and the rotating side 27f in the direction of its travel to the extent of substantially 120 degrees, at which point the crown gear 63 will be aligned with the other driven gear 44, which gear drives the work shaft 86 to operate the milling apparatus carried on the vehicle.

The lever 114 will be particularly adapted to move the linkage connecting it with the shaft 69 and the crown gear 63 carried by it to points of alignment with either the gear 43 or 44 as the case may be.

In returning the crown gear from the driven gear 44 to the driven gear 43, the lever 114 will be moved forwardly to tilt the housing 18 upwardly into substantially a vertically disposed position.

Thus it is seen that the housing 18 and the gears therein are aligned with either the differential shaft 46 or the work shaft 47.

It is seen that the housing 18 and the respective gears involved therein will be axially aligned with either the differential shaft or the work shaft, as the case may be.

Thus I have provided a simple and efficient combination of hydraulic and mechanical means to positively and directly effect a transfer of a driving mechanism permitting the utilization of driving means of a motor vehicle for other work.

It will of course be understood that various changes may be made in the form, details, arrangement and proportions of the parts, without departing from the scope of applicant's invention, which, generally stated, consists in an apparatus capable of carrying out the objects above set forth, in the parts and combinations of parts disclosed and defined in the appended claims.

What is claimed is:

1. A power transfer mechanism of the character indicated having in combination,
    a frame embodying driving means,
    a driving shaft,
    a pair of driven shafts, said driven shafts being disposed at a substantially parallel angular relationship to one another,
    supporting means for said shafts,
    a housing,
    means supporting said housing on said frame for tilting movement,
    said housing comprising
    a drum, a pair of spaced driven gears carried in said drum, means respectively connecting said gears with said driven shafts,
    a second drum rotatably mounted in said housing, a driving gear carried by said second drum, means connecting said driving gear and said driving shaft, means simultaneously tilting said housing and rotating said second drum for alignment of said driving gear with a selected one of said driven gears,
means normally urging said driving gear into driving engagement with said selected driven gear, and
means disengaging said driving gear from said driving engagement.

2. A motor vehicle of the character described having in combination,
driving means,
a pair of driven shafts, one of said shafts being disposed to operate said vehicle, and the other of said shafts being disposed to operate work means carried by said vehicle,
a gear housing,
means supporting said gear housing on the frame of said vehicle for tilting movement,
said housing comprising
a drum, a pair of driven gears carried in said drum, universal connecting means respectively connecting said gears with said driven shaft,
a second drum rotatably mounted in said housing, a driving gear carried by said second drum arranged to have driving engagement with said driven gears, universal connecting means connecting said driving gear and said driving means,
means simultaneously tilting said housing and rotating said second drum for alignment of said driving gear with a selected one of said driven gears,
means carried by said housing normally urging said driving gear into driving engagement with said selected driven gear, and
means disengaging said driving gear for said selected driven gear.

3. The structure set forth in claim 2,
said last mentioned means comprising a bracket supported by said vehicle,
a plate member pivoted to said bracket,
a lever actuated means pivoting said plate,
means linking said plate member with said first mentioned means,
a crank having one end secured to said second drum,
means linking said crank with said plate member, and
said linking means being arranged to simultaneously tilt said housing and rotate said second drum responsive to pivoted movement of said plate member.

4. The structure set forth in claim 2,
said universal connecting means comprising axial movable means with reference to the respective gears connected therewith.

5. The structure set forth in claim 2,
said disengaging means comprising a hydraulically operated piston, and
means actuating said disengaging means.

References Cited

UNITED STATES PATENTS

| | | | |
|---|---|---|---|
| 1,156,938 | 9/1914 | Small | 74—356 |
| 1,456,289 | 5/1923 | Storey. | |
| 1,754,133 | 4/1930 | Van Der Ploeg | 74—356 X |
| 1,849,285 | 3/1932 | Dickey | 74—356 |
| 2,803,326 | 8/1957 | Wilkinson | 192—48 |

DONLEY J. STOCKING, *Primary Examiner.*

JOHN R. BENEFIEL, *Assistant Examiner.*